(12) United States Patent
Madhusudana et al.

(10) Patent No.: US 9,304,876 B2
(45) Date of Patent: Apr. 5, 2016

(54) LOGICAL VOLUME MIGRATION IN SINGLE SERVER HIGH AVAILABILITY ENVIRONMENTS

(71) Applicant: LSI Corporation, San Jose, CA (US)

(72) Inventors: Naresh Madhusudana, Bangalore (IN); Naveen Krishnamurthy, Bangalore (IN); Sridhar Rao Veerla, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 116 days.

(21) Appl. No.: 14/269,410

(22) Filed: May 5, 2014

(65) Prior Publication Data

US 2015/0317219 A1  Nov. 5, 2015

(51) Int. Cl.
G06F 11/20 (2006.01)
G06F 13/42 (2006.01)
G06F 11/30 (2006.01)

(52) U.S. Cl.
CPC ........ *G06F 11/2017* (2013.01); *G06F 11/2082* (2013.01); *G06F 11/3027* (2013.01); *G06F 13/4221* (2013.01); *G06F 2201/84* (2013.01)

(58) Field of Classification Search
CPC ............ G06F 11/2089; G06F 11/1666; G06F 11/073; G06F 11/0793; G06F 11/0796; G06F 11/108; G06F 11/1088; G06F 11/2094; G06F 11/1616; G06F 11/2017; G06F 13/20; G06F 13/404; G06F 13/4221
See application file for complete search history.

(56) References Cited

U.S. PATENT DOCUMENTS

| | | | |
|---|---|---|---|
| 7,917,682 B2 | 3/2011 | Bakthavathsalam | |
| 8,438,324 B2 | 5/2013 | Cho | |
| 8,484,400 B2* | 7/2013 | Cho ........................ | G06F 3/061 710/300 |
| 8,645,623 B1 | 2/2014 | O'Shea et al. | |
| 8,880,768 B2* | 11/2014 | Mathew .............. | G06F 13/4221 710/20 |
| 8,880,800 B2* | 11/2014 | Mathew .............. | G06F 11/1076 710/313 |
| 2010/0332784 A1* | 12/2010 | Shibayama ........... | G06F 3/0605 711/165 |
| 2011/0202791 A1* | 8/2011 | Saitou .................. | G06F 11/2097 714/6.12 |
| 2013/0067163 A1 | 3/2013 | Velayudhan et al. | |
| 2013/0339594 A1 | 12/2013 | Math et al. | |

OTHER PUBLICATIONS

PCI Express®, Base Specification, Revision 3.0, Nov. 10, 2010.
Penokie, Information Technology—SAS Protocol Layer—3 (SPL-3), Working Draft American National Standard, Project T10/BSR INCITS 492, Revision 04, Jul. 24, 2013.
U.S. Appl. No. 14/173,540.

* cited by examiner

Primary Examiner — Nadeem Iqbal (57) ABSTRACT

Methods and structure for migrating logical volumes are provided. The system includes a Redundant Array of Independent Disks controller, which includes a Peripheral Component Interconnect Express interface, a Serial Attached Small Computer System Interface port operable to communicate with another Redundant Array of Independent Disks controller, and a command unit. The command unit is able to direct the interface to access another Peripheral Component Interconnect Express interface at the other controller, to synchronize with Disk Data Format information from a Peripheral Component Interconnect Express Inbound Map of the other interface, to detect that the other controller has failed, and to utilize the Disk Data Format information to migrate a logical volume from the other controller to the controller.

20 Claims, 8 Drawing Sheets

LOGICAL VOLUME MIGRATION IN SINGLE SERVER HIGH AVAILABILITY ENVIRONMENTS

FIELD OF THE INVENTION

The invention relates generally to Redundant Array of Independent Disks (RAID) systems, and more specifically to Single Server High Availability (SSHA) systems.

BACKGROUND

In SSHA systems, a single host is coupled with multiple RAID controllers. The RAID controllers are each connected to a shared set of storage devices via a common protocol (e.g., Small Computer System Interface (SCSI), Serial Attached SCSI (SAS), etc.), and the RAID controllers are used to retrieve and/or store data at the set of storage devices. The host utilizes a Multi-Path Input/Output (MPIO) driver to direct Input/Output (I/O) operations to the RAID controllers. The RAID controllers can each manage I/O for one or more logical RAID volumes, and serve as backup controllers for each other in case of a failure. Thus, when one RAID controller fails, the other RAID controller utilizes Disk Data Format (DDF) information from the storage devices to migrate logical volumes that were previously managed by the failed controller.

SUMMARY

Systems and methods herein utilize shared Peripheral Component Interconnect Express (PCIe) memory access between controllers, in order to enable a controller to quickly load DDF information from a failed counterpart.

One exemplary embodiment is a Redundant Array of Independent Disks controller, which includes a Peripheral Component Interconnect Express interface, a Serial Attached Small Computer System Interface port operable to communicate with another Redundant Array of Independent Disks controller, and a command unit. The command unit is able to direct the interface to access another Peripheral Component Interconnect Express interface at the other controller, to synchronize with Disk Data Format information from a Peripheral Component Interconnect Express Inbound Map of the other interface, to detect that the other controller has failed, and to utilize the Disk Data Format information to migrate a logical volume from the other controller to the controller.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
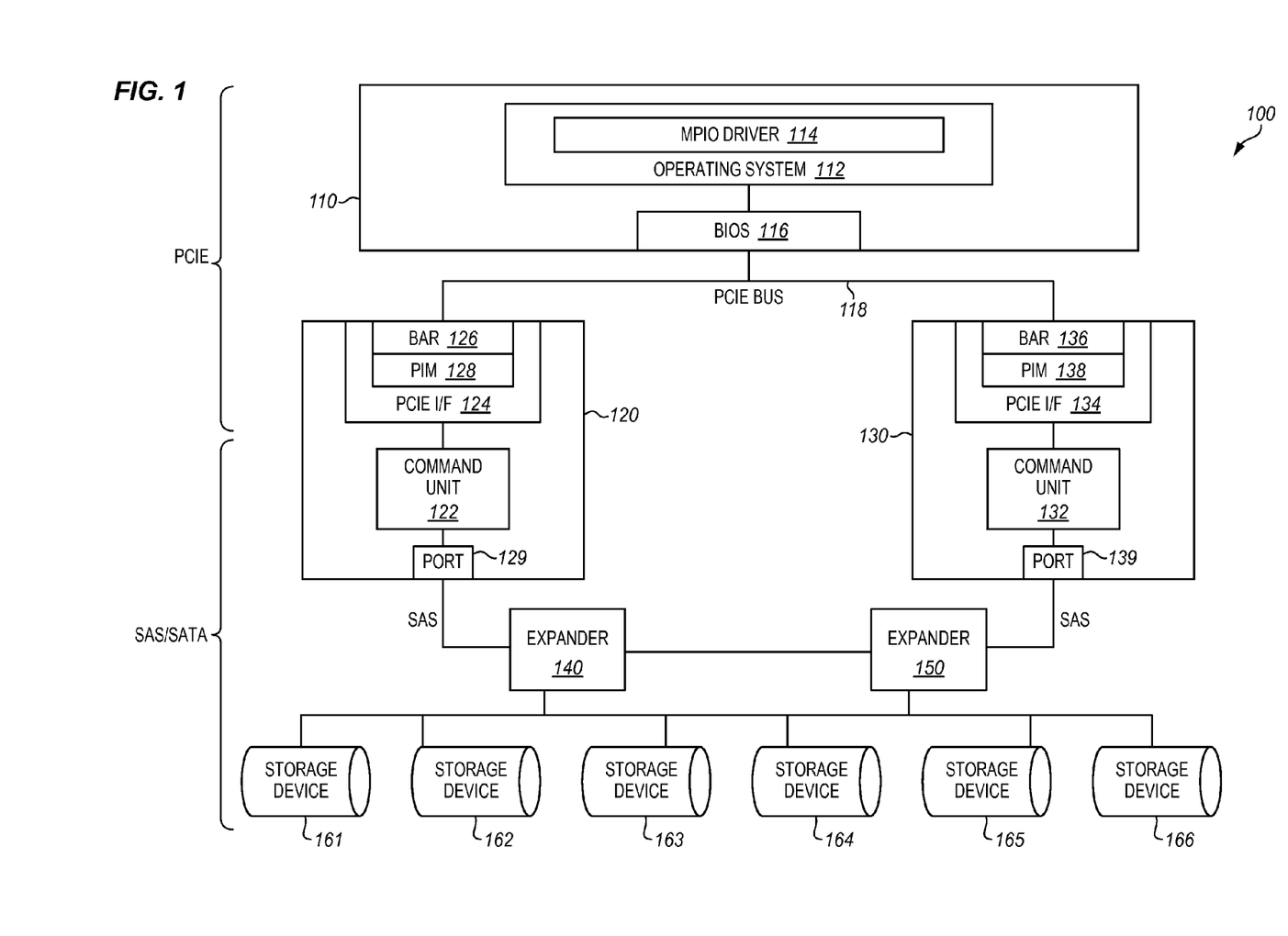
FIG. 1 is a block diagram of an exemplary SSHA architecture.

FIG. 1 is a block diagram of an exemplary SSHA architecture 100. SSHA architecture 100 provides redundant I/O paths for host 110 to store data at (and/or read data from) a set of storage devices 161-166. In this embodiment, host 110 is coupled to PCIe bus 118, which is itself connected to RAID controllers 120 and 130. RAID controllers 120 and 130 are each coupled via an intervening SAS expander (140 and 150 respectively) to storage devices 161-166.

While in operation, Operating System (OS) 112 generates host I/O requests directed to logical volumes kept on storage devices 161-166 and owned by (i.e., under control of) RAID controllers 120 and 130. These I/O requests, directed to individual logical volumes, are routed to the appropriate RAID controller via logic within MPIO driver 114. In one embodiment, SCSI persistent reservations are used to associate each logical volume with a RAID controller. MPIO driver 114 then utilizes Asymmetric Logical Unit Access (ALUA) techniques to direct the host I/O requests to their appropriate RAID controller.

Each host I/O request is received at a PCIe interface (I/F) (124, 134) of a RAID controller, and is then processed into one or more SAS and/or Serial Advanced Technology Attachment (SATA) commands that are directed to individual storage devices coupled with the RAID controller. In this manner, host I/O is seamlessly translated into a series of SAS/SATA commands for writing and/or retrieving data. Thus, RAID controllers 120 and 130 operate as SAS initiators for SSHA architecture 100.

The configuration of RAID controllers 120 and 130 with respect to each logical volume is herein referred to as an active-passive configuration. In this configuration, each RAID controller actively manages I/O directed to the logical volumes that it owns, and is prepared to assume control of logical volumes owned by the other RAID controller if needed. The redundancy implemented by RAID controllers 120 and 130 is highly desirable in SSHA architectures in order to ensure that data remains available even if a failure occurs in one or more devices.

SSHA architecture 100 exhibits a benefit over prior SSHA architectures, because RAID controllers 120 and 130 of SSHA architecture 100 are each capable of maintaining DDF information within a PCIe Inbound Map (PIM) of a PCIe interface that is accessible to the other controller. This allows the DDF information to be quickly exchanged between RAID controllers 120 and 130 via PCIe bus 118. Thus, there is no need for a RAID controller to read DDF information from each storage device 161-166 in the event of a failover. Instead, the DDF information is copied/accessed directly via PCIe bus 118.

Host 110 comprises any suitable combination of hardware components capable of implementing programmed instructions for manipulating data. For example, host 110 can comprise a server, a general purpose computer, an integrated circuit, etc. In this embodiment, one or more processors and memories within host 110 implement OS 112, MPIO driver 114, and Basic Input Output System (BIOS) 116. OS 112 manages the general operations of host 110. MPIO driver 114 is capable of determining the logical volume that each incoming request is directed to. MPIO driver 114 then directs each request (via PCIe bus 118) to the RAID controller that is listed as the active controller for the corresponding logical volume. BIOS 116 is implemented by one or more processors and memories to manage interactions between MPIO driver 114 and PCIe bus 118.

RAID controllers 120 and 130 each include their own PCIe interface (124, 134). Each PCIe interface includes a memory that lists a Base Address Register (BAR) address (126, 136) of the RAID controller on PCIe bus 118. Each PCIe interface also includes a PCIe Inbound Map (PIM) (128, 138) that stores DDF information. The PIM can also include a copy of the SAS address of the RAID controller in which the PIM is located. The DDF information describes the current arrangement of logical volumes and/or Logical Block Addresses (LBAs) on storage devices 161-166. Even further, the PIM can include run time RAID configuration data.

The DDF information kept in a PIM represents the current DDF information used by the RAID controller to manage the logical volumes. In one embodiment, this DDF information kept in the PIM mirrors the "active" version of DDF information used by the RAID controller during normal RAID operations (and kept within a separate memory of the RAID controller). In another embodiment, the DDF information in the PIM serves as the "active" version.

Each RAID controller also includes a command unit (122, 132) that manages the operations of the RAID controller. In one embodiment, these operations include translating host I/O requests into one or more SAS/SATA requests sent out via a SAS port (129, 139) (e.g., a SAS wide or narrow port comprising one or more SAS physical links (PHYs)). In further embodiments, the operations include updating DDF information, performing SAS discovery if a SAS topology change is detected, etc. A command unit can be implemented as custom circuitry, a processor executing programmed instructions stored in program memory, or some combination thereof.

RAID controllers 120 and 130 can additionally be coupled for communication via one or more dedicated intercontroller links (e.g., SAS links, Ethernet links, etc.). Such links can be used, for example, in order to ship I/O between controllers and/or mirror RAID cache data (e.g., as discussed in U.S. Pat. Pub. 2013/0067163).

A switched fabric (in this embodiment, SAS expanders 140 and 150) couples the RAID controllers with storage devices 161-166. Thus, even if one RAID controller fails, the other RAID controller can access storage devices 161-166 via the switched fabric in order to manage I/O for the logical volumes. Storage devices 161-166 implement the persistent storage capacity for SSHA architecture 100, and are capable of writing and/or reading data for a logical volume in a computer readable format. For example, storage devices 161-166 can comprise magnetic hard disks, solid state drives, optical media, etc. compliant with protocols for SAS and/or SATA.

As used herein, a logical volume comprises allocated storage space and data available at one or more storage devices. A logical volume can be implemented on any number of storage devices as a matter of design choice. Furthermore, the storage devices need not be dedicated to only one logical volume.

While only two RAID controllers are shown in FIG. 1, any number of controllers can be utilized to manage the logical volumes of SSHA architecture 100. Furthermore, the particular arrangement, number, and configuration of components described herein with regard to FIG. 1 is exemplary and non-limiting.

Figure 2:
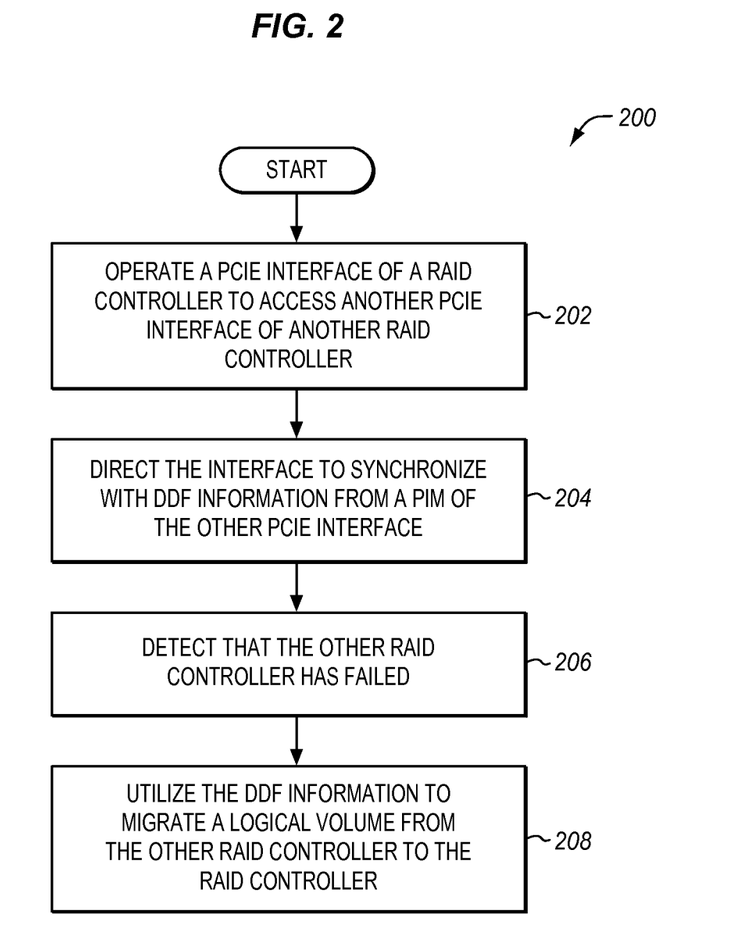
FIG. 2 is a flowchart describing an exemplary method to utilize DDF information from a PCIe Inbound Map (PIM) of a PCIe interface of a coupled RAID controller.

FIG. 2 is a flowchart 200 describing an exemplary method to utilize DDF information from a PIM of a PCIe interface of a coupled RAID controller. Assume, for this embodiment, that both RAID controllers 120 and 130 have initialized to control/manage/own one or more logical volumes in an active/passive configuration. Also, assume that BIOS 116 has determined the BAR address of each of RAID controllers 120 and 130 via communications on PCIe bus 118. BIOS 116 has provided each RAID controller with the BAR address(es) of its peer RAID controller(s), enabling PCIe communications between RAID controllers 120 and 130 via PCIe bus 118.

Further, assume that a suitable event has occurred to trigger method 200. In one embodiment the event comprises command unit 122 reading PIM 138 to detect a status message indicating that DDF information at RAID controller 130 has been changed. RAID controller 120 attempts to mirror the DDF information from PIM 138 of RAID controller 130, in order to ensure that the DDF information is synchronized across the controllers. To this end, in step 202 command unit 122 operates PCIe interface 124 to access PCIe interface 134 via PCIe bus 118.

In step 204, command unit 122 directs PCIe interface 124 to synchronize with DDF information from PIM 138, for example, by directing PCIe interface 124 to generate a signal for accessing a specific portion of PIM 138. Command unit 122 copies the DDF information for the volumes managed by RAID controller 130 into its own memory for processing. For example, the DDF information can be copied into an internal memory of command unit 122 itself, into PIM 128, etc. Similar synchronization processes can occur on RAID controller 130 as it attempts to synchronize its own DDF information to keep track of changes made to the logical volumes owned by RAID controller 120.

In step 206, RAID controller 120 detects that RAID controller 130 has failed. In one embodiment, command unit 122 detects the failure of RAID controller 130 via a status change indicated in PIM 138. For example, the failure of RAID controller 130 can be detected via SAS port 129. In another example, command unit 122 determines that RAID controller 130 has failed by detecting a topology change indicated in a BROADCAST (CHANGE) primitive received at SAS port 129, identifying a status change in PIM 138 indicating a failure of RAID controller 130, transmitting a Test Unit Ready (TUR) SCSI command to RAID controller 130 via SAS port 129, and confirming that RAID controller 130 is unresponsive to the TUR SCSI command.

Upon determining that RAID controller 130 has failed, RAID controller 120 attempts to assert control over the volumes previously owned by RAID controller 130. Thus, in step 208 command unit 122 utilizes the DDF information that was previously synchronized/mirrored in order to migrate one or more logical volumes from RAID controller 130 to RAID controller 120. In a further embodiment, command unit 122 can use PIM 138 to synchronize DDF information even after RAID controller 130 has failed (because PIM 138 remains available via PCIe bus 118).

In one embodiment, command unit 122 changes each of the SCSI persistent reservations for the volumes previously owned by RAID controller 130, in order to assume ownership of these volumes. Command unit 122 then directs PCIe interface 124 to inform MPIO driver 114 of the change in ownership of the volumes. Thus, MPIO driver 114 sends host I/O for the newly migrated volumes to RAID controller 120 instead of RAID controller 130.

Method 200 provides an advantage over prior SSHA architectures that dealt with failovers for redundant storage controllers. Specifically, method 200 avoids the need for RAID controller 120 to read DDF information from many individual storage devices in order to assume ownership of the logical volumes. Since the DDF information is already synchronized before failure via PCIe bus 118, RAID controller 120 can quickly and efficiently failover logical volumes that were previously owned by failed RAID controller 130. A faster, more efficient failover process is highly desirable in SSHA environments, because failover processes delay the servicing of host I/O requests. Method 200 provides an additional benefit in that failure of a RAID controller can be detected via PCIe bus 118 if desired, meaning that discovery does not have to be completed via SAS port 129 in order to detect failure of RAID controller 130.

Even though the steps of method 200 are described with reference to SSHA architecture 100 of FIG. 1, method 200 can be performed in other systems where RAID controllers operate together to service one or more logical volumes. The steps of the flowcharts described herein are not all inclusive and can include other steps not shown. The steps described herein can also be performed in an alternative order.

EXAMPLES

In the following examples, additional processes, systems, and methods are described in the context of an SSHA architecture.

Figure 3:
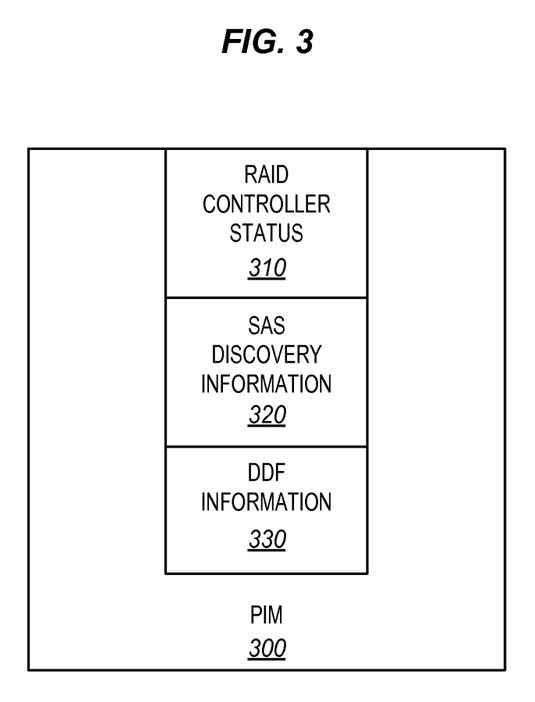
FIG. 3 is a block diagram illustrating the contents of an exemplary PIM of a PCIe interface of a RAID controller.

FIG. 3 is a block diagram illustrating the contents of an exemplary PIM 300 of a PCIe interface of a RAID controller. According to FIG. 3, PIM 300 includes not only DDF information 330, but also a RAID controller status 310, and SAS discovery information 320. RAID controller status 310 can be used by a RAID controller to indicate whether it is currently operating properly, is currently engaged in the discovery process, has encountered a failure, etc. In this manner, the RAID controllers can track the status of their peers via a PCIe bus, and without relying on SAS communications. This can facilitate the early detection of a failure at a RAID controller, further increasing the speed at which a failover can be performed.

In this example, SAS discovery information (or a copy thereof) is also kept in PIM 300. An MPIO driver can designate a RAID controller as a "primary" discovery device, causing it to actively engage in discovery while other RAID controller(s) halt/prevent discovery and wait (e.g., utilizing their processing resources to perform other tasks). The command unit of the other RAID controller periodically checks on the status of the "primary" RAID controller until it determines that discovery has completed. After discovery has completed, the waiting RAID controller acquires the discovery information from PIM 300 and copies the discovery information into memory in order to accelerate its own discovery process, or instead of independently performing discovery. The waiting RAID controller then sends a TUR SCSI command to each discovered device, confirming that the device is actually available. Designating a "primary discovery" RAID controller helps to reduce discovery traffic along the SAS domain, increasing the overall speed of the discovery process. In further embodiments, the waiting RAID controller engages in a private discovery process to identify any devices that are privately coupled with it (and therefore invisible to the primary discovery device).

Figure 4:
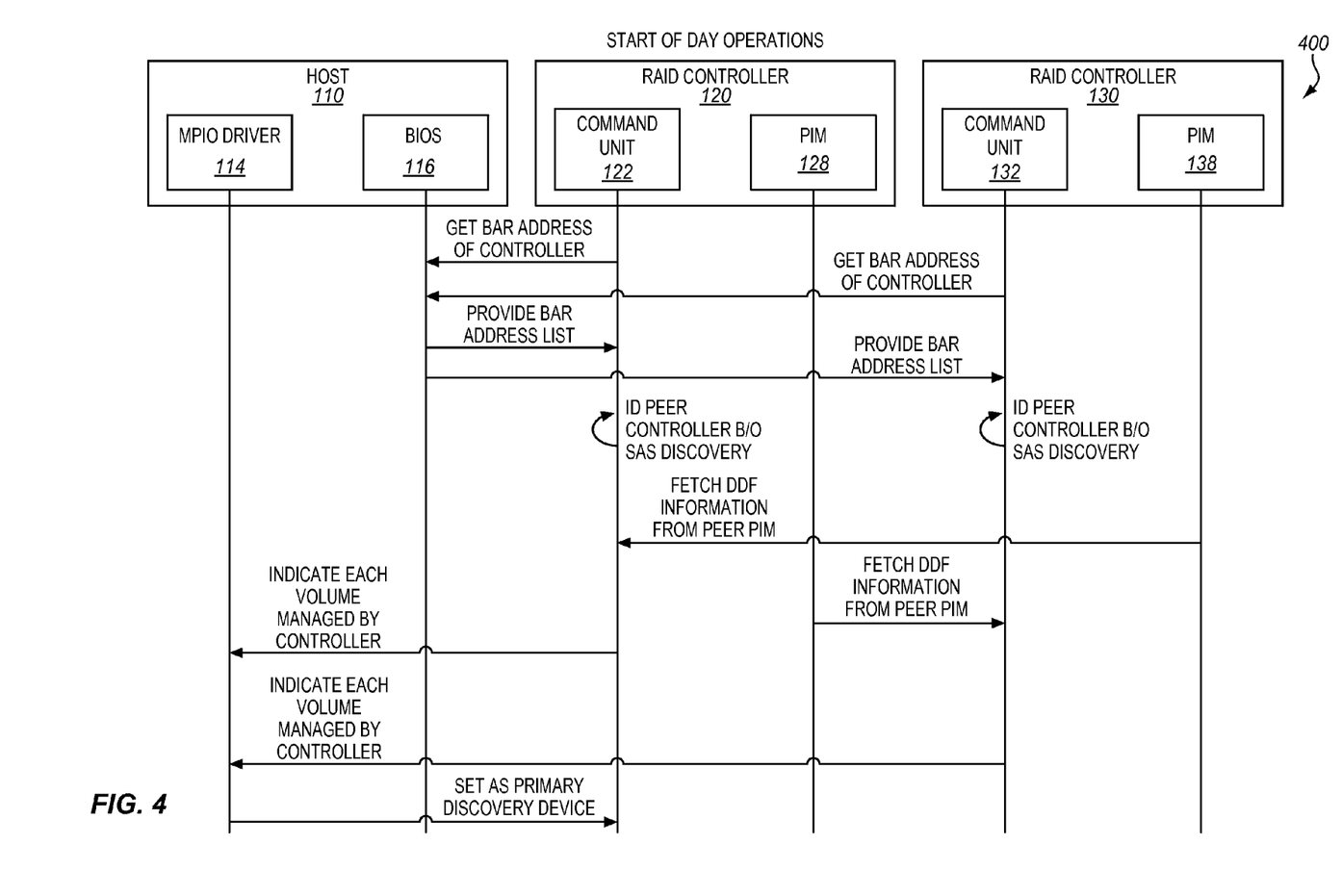
FIGS. 4-7 are message diagrams illustrating exemplary communications between devices in an SSHA architecture.

FIGS. 4-7 are message diagrams illustrating exemplary communications between devices in an SSHA architecture. Specifically, FIG. 4 is a message diagram 400 illustrating exemplary start of day operations within SSHA architecture 100. According to FIG. 4, at boot time BIOS 116 acquires the BAR address of each RAID controller, and then sends out a list to each controller indicating the BAR addresses (and/or SAS addresses) of other controllers coupled with host 110 via a PCIe bus. The BIOS can quickly review the PIM of each controller to identify this information, and then broadcast the information across the PCIe bus. In embodiments where no BIOS exists for managing the RAID controllers, the system BIOS of the host (or a host driver) can provide this information.

The RAID controllers then engage in SAS discovery and identify each other on the SAS domain. Once the RAID controllers have identified each other on the SAS domain, they begin to calibrate their processes to operate as part of an SSHA environment (e.g., to operate in an active-passive mode with respect to various logical volumes). The RAID controllers 120 and 130 fetch DDF information from each other via the PCIe bus. The RAID controllers then indicate the details of each volume that they manage to MPIO driver 114, in order for MPIO driver 114 to direct incoming host I/0 requests properly. In this example, the information sent to MPIO driver 114 includes ALUA information for each logical volume. The RAID controllers can further update DDF information on the storage devices, if desired.

MPIO driver 114 then selects a RAID controller to operate as a "primary" discovery device. Any suitable criteria can be used to pick the primary discovery device. In this example, MPIO driver 114 picks the RAID controller associated with the smallest number of logical volumes as the primary discovery device.

Figure 5:
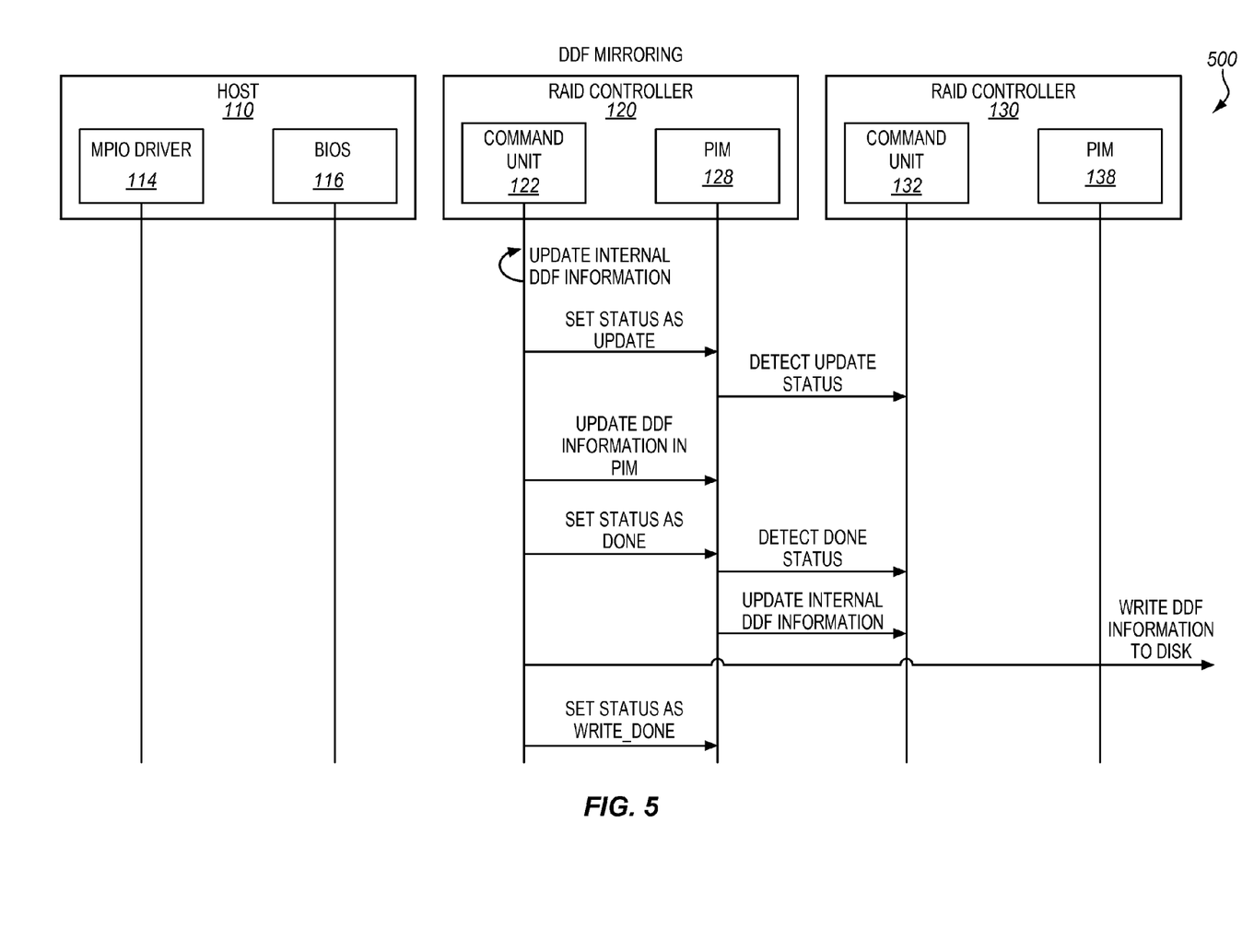

FIG. 5 is a message diagram 500 illustrating exemplary DDF mirroring operations. According to FIG. 5, RAID controller 120 implements a change to a logical volume that it owns (e.g., by changing a RAID level for the volume, remapping LBAs to physical storage devices, rebuilding the volume onto a new storage device, etc.). As a part of this process, command unit 122 updates its own DDF information stored in internal memory. Command unit 122 then updates its status in PIM 128 to indicate that its status is now UPDATE. Command unit 132 detects this change in status via PCIe bus 118, and waits for the update to complete before mirroring the changes. Meanwhile, command unit 122 copies the changes to the DDF information into PIM 128, so that PIM 128 accurately mirrors the DDF information stored internally at command unit 122. Once the DDF information in PIM 128 has been properly updated, command unit 122 sets its status in PIM 128 as DONE, signaling to RAID controller 130 that the DDF information in PIM 128 is ready for mirroring. Once command unit 132 detects the DONE status, it updates its internal DDF information (and/or the information at PIM 138) in order to reflect the changes made to the volume by command unit 122. In this manner, the RAID controllers maintain accurate mirrored copies of each other's DDF information. Command unit 122 also updates storage devices 161-166 with the newly updated DDF information, and then sets its status as WRITE_DONE.

The WRITE_DONE status ensures that operations are performed atomically by the RAID controllers. For example, in one embodiment RAID controller 130 cannot access DDF data while RAID controller 120 is still in the process of updating the storage devices. As such, the WRITE_DONE status can indicate that the DDF data is available and in a consistent state.

Figure 6:
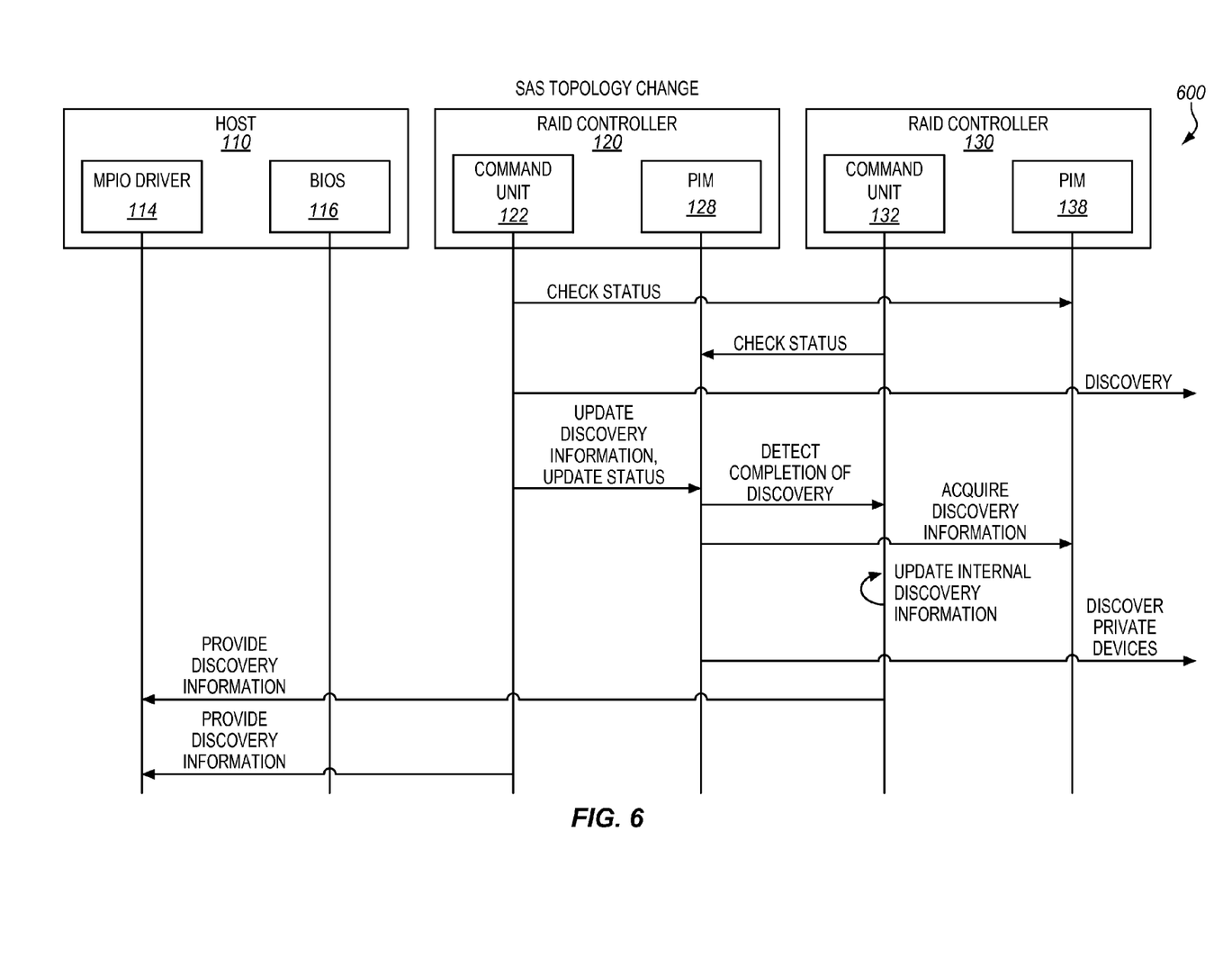
Figure 7:
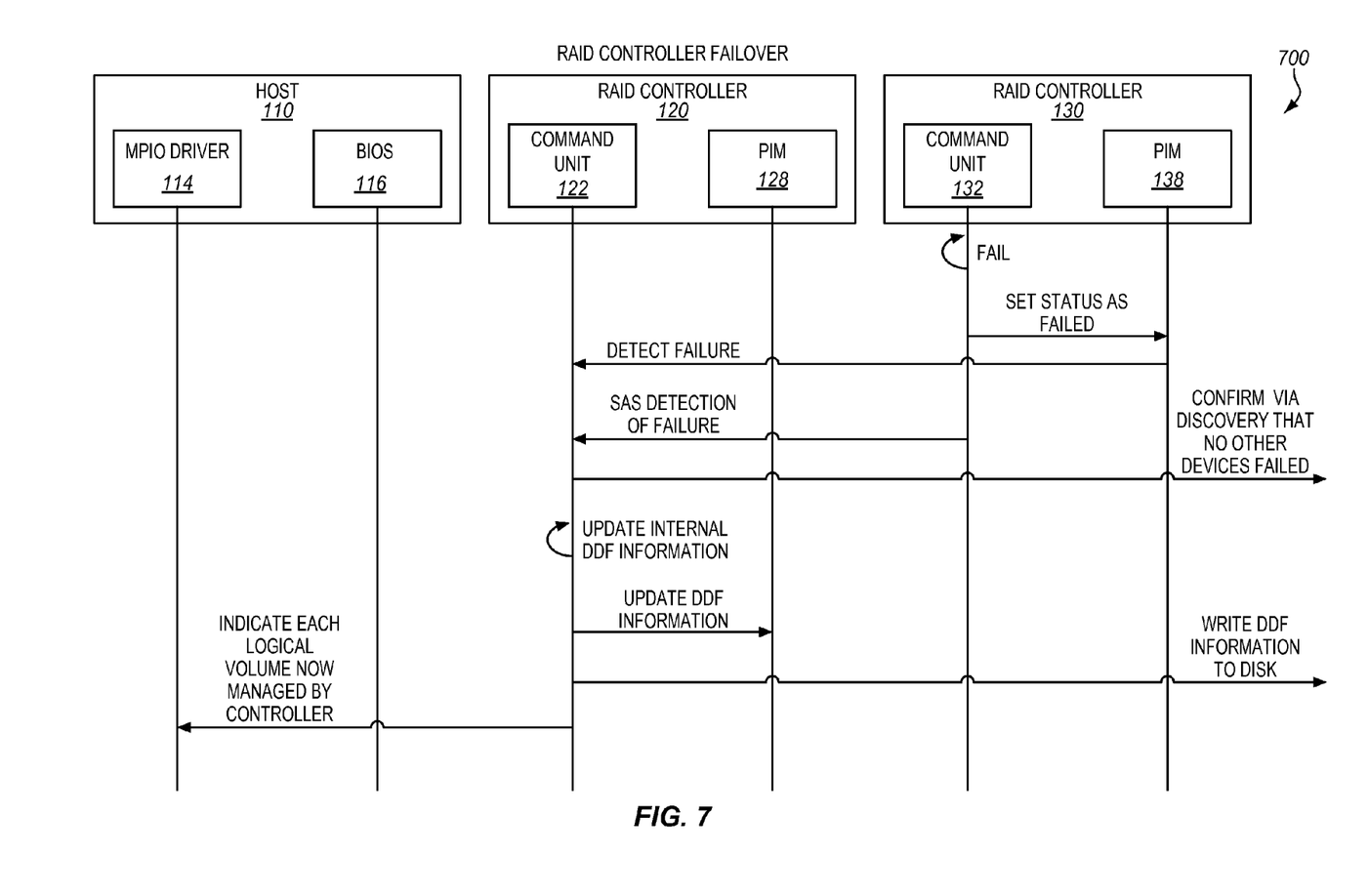

FIG. 6 is a message diagram 600 illustrating exemplary operations performed after a SAS topology change has been detected (e.g., after a BROADCAST (CHANGE) primitive has been received at RAID controllers 120 and 130). According to FIG. 6, once each controller detects a topology change, it checks on the status of the other RAID controller indicated in the PIM of the other controller. If the status of the other controller indicates that it has failed, then failover operations as described in FIG. 7 are performed. However, if the status of the other RAID controller is still functional, then RAID controller 120, which is the primary discovery device, engages in SAS discovery via port 129, while RAID controller 130 waits in order to reduce traffic on the SAS domain.

Once discovery completes at RAID controller 120, it updates discovery information stored at PIM 128 and updates its status at PIM 128 to indicate that discovery has completed. Command unit 132, which has been operating PCIe interface 134 to poll PIM 128, detects completion of discovery and proceeds to load the discovery information from PIM 128. Command unit 132 then uses this discovery information to interact with storage devices on the SAS domain, and engages in a private discovery process for any private devices coupled with RAID controller 130. RAID controller 130 also sends out TUR SCSI commands to each device discovered by RAID controller 120, in order to ensure that the devices are actually available. Both RAID controllers then provide their discovery information to MPIO driver 114. Discovery information can include target group information to inform MPIO driver 114 of any multipath devices and their currently active/inactive paths. Since both controllers provide discovery about the same logical volumes to MPIO driver 114, MPIO driver 114 (and/or OS 112) is capable of identifying the logical volumes as available via multiple different paths.

FIG. 7 is a message diagram 700 illustrating exemplary operations occurring during a failover. According to FIG. 7, when RAID controller 130 fails, command unit 132 updates the status in PIM 138 to indicate the failure. Then, RAID controller 120 detects the failure via the PCIe bus. RAID controller 120 also detects through its SAS link that RAID controller 130 has failed by determining that a SAS link with RAID controller 130 is down. Command unit 122 then confirms that only RAID controller 130 failed (and not more devices) by sending a TUR SCSI command to each device on its discovery list, and confirming that only RAID controller 130 has become unresponsive. RAID controller 120 then updates/revises its internally stored DDF information to assume control of the logical volumes previously owned by RAID controller 130 (e.g., by performing operations such as acquiring a SCSI persistent reservation for each of the logical volumes). Command unit 122 then updates PIM 128 and the storage devices with the new DDF information, and informs MPIO driver 114 of each volume now managed by RAID controller 120.

In a further example, RAID controllers 120 and 130 can detect and resolve a "split brain" condition, which occurs when both RAID controllers are operational, but a SAS link between the controllers goes down. In such an example, once the SAS link goes down, each RAID controller checks the status of the other RAID controller in PIM to confirm that the other controller is still operational. If both RAID controllers are still operational, then after determining that the SAS topology has changed (e.g., via a BROADCAST (CHANGE) primitive), they send each other a TUR SCSI command The TUR SCSI command fails for each controller, confirming that the controllers are now operating in a "split brain" condition where SAS communications with each other are not possible. Each RAID controller also sends a TUR SCSI command to each SAS device on the domain to confirm no other links have gone down. The RAID controllers then update MPIO driver 114 to inform MPIO driver 114 of the condition, allowing MPIO driver 114 to take further action as desired.

Figure 8:
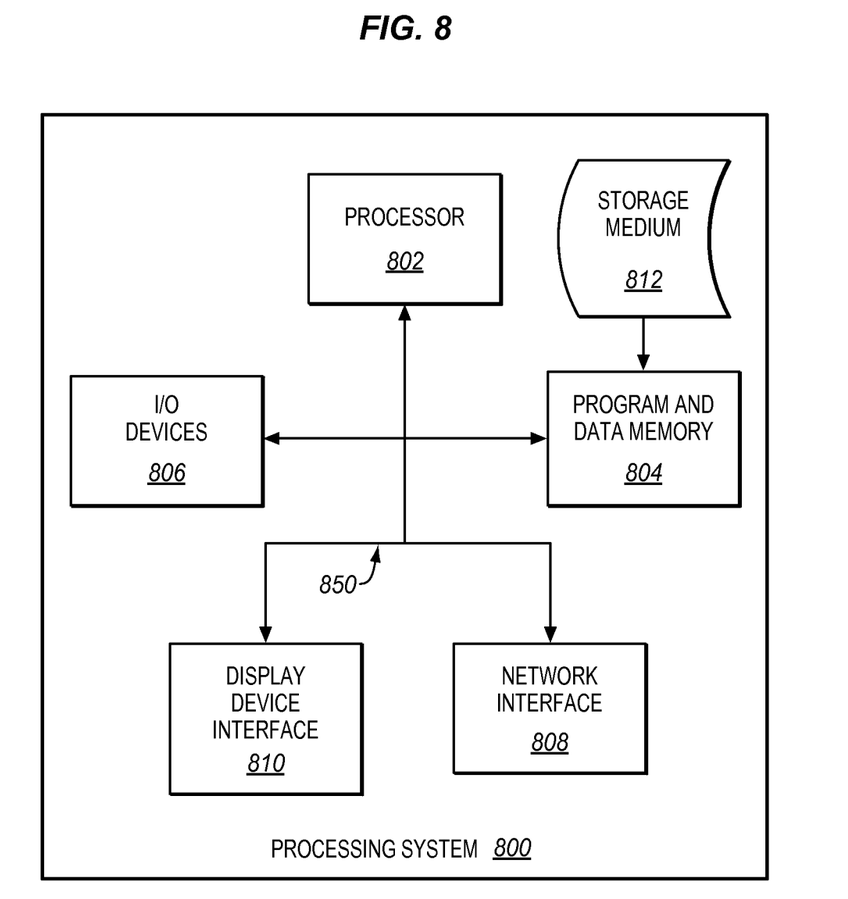
FIG. 8 illustrates an exemplary processing system operable to execute programmed instructions embodied on a computer readable medium.

Embodiments disclosed herein can take the form of software, hardware, firmware, or various combinations thereof In one particular embodiment, software is used to direct a processing system of command unit 122 to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer (e.g., processing system 800) or any other instruction execution system. For the purposes of this description, computer readable storage medium 812 can be anything that can contain or store the program for use by the computer (e.g., processing system 800).

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk - read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 can also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 can be integrated with the system to interface to one or more display devices, such as printing systems and screens for presentation of data generated by processor 802.

What is claimed is:

1. A system comprising:
a Redundant Array of Independent Disks controller comprising:
a Peripheral Component Interconnect Express interface;
a Serial Attached Small Computer System Interface port operable to communicate with another Redundant Array of Independent Disks controller; and
a command unit operable to direct the interface to access another Peripheral Component Interconnect Express interface at the other controller, to synchronize with Disk Data Format information from a Peripheral Component Interconnect Express Inbound Map of the other interface, to detect that the other controller has failed, and to utilize the Disk Data Format information to migrate a logical volume from the other controller to the controller.

2. The system of claim 1, wherein:
the interface comprises a Peripheral Component Interconnect Express Inbound Map that includes Disk Data Format information describing a logical volume owned by the controller.

3. The system of claim 1, wherein:
the interface comprises a Peripheral Component Interconnect Express Inbound Map that includes Serial Attached Small Computer System Interface discovery information acquired by the controller.

4. The system of claim 1, wherein:
the command unit is further operable to identify status information for the other controller stored in the Peripheral Component Interconnect Express Inbound Map of the other interface, and to migrate the logical volume if the status information indicates a failure of the other controller.

5. The system of claim 1, wherein:
the command unit is further operable to detect a change in Serial Attached Small Computer System Interface topology, to detect Serial Attached Small Computer System Interface discovery information stored in the Peripheral Component Interconnect Express Inbound Map of the other interface, and to utilize the discovery information to accelerate discovery at the controller.

6. The system of claim 5, wherein:
the command unit is further operable to identify multiple Serial Attached Small Computer System Interface devices based on the discovery information, and to confirm the existence of the devices by sending a Test Unit Ready command to each of the devices.

7. The system of claim 1, wherein:
the command unit is further operable to store a Base Address Register indicating an address of the other controller.

8. A method comprising:
operating a Peripheral Component Interconnect Express interface of a Redundant Array of Independent Disks controller to access another Peripheral Component Interconnect Express interface at another Redundant Array of Independent Disks controller, wherein the controller is operable to communicate with the other controller via a Serial Attached Small Computer System Interface port;
directing the interface to synchronize with Disk Data Format information from a Peripheral Component Interconnect Express Inbound Map of the other interface;
detecting that the other controller has failed; and
utilizing the Disk Data Format information to migrate a logical volume from the other controller to the controller.

9. The method of claim 8, wherein:
the interface comprises a Peripheral Component Interconnect Express Inbound Map that includes Disk Data Format information describing a logical volume owned by the controller.

10. The method of claim 8, wherein:
the interface comprises a Peripheral Component Interconnect Express Inbound Map that includes Serial Attached Small Computer System Interface discovery information acquired by the controller.

11. The method of claim 8, further comprising:
identifying status information for the other controller stored in the Peripheral Component Interconnect Express Inbound Map of the other interface; and
migrating the logical volume if the status information indicates a failure of the other controller.

12. The method of claim 8, further comprising:
detecting a change in Serial Attached Small Computer System Interface topology;
detecting Serial Attached Small Computer System Interface discovery information stored in the Peripheral Component Interconnect Express Inbound Map of the other interface; and
utilizing the discovery information to accelerate discovery at the controller.

13. The method of claim 12, further comprising:
identifying multiple Serial Attached Small Computer System Interface devices based on the discovery information; and
confirming the existence of the devices by sending a Test Unit Ready command to each of the devices.

14. The method of claim 8, further comprising:
storing a Base Address Register at the controller indicating an address of the other controller.

15. A system comprising:
a Redundant Array of Independent Disks controller comprising:
a Peripheral Component Interconnect Express interface;
a Serial Attached Small Computer System Interface port operable to communicate with another Redundant Array of Independent Disks controller; and
a means for directing the interface to access another Peripheral Component Interconnect Express interface at the other controller, synchronizing with Disk Data Format information from a Peripheral Component Interconnect Express Inbound Map of the other interface, detecting that the other controller has failed, and utilizing the Disk Data Format information to migrate a logical volume from the other controller to the controller.

16. The system of claim 15, wherein:
the interface comprises a Peripheral Component Interconnect Express Inbound Map that includes Disk Data Format information describing a logical volume owned by the controller.

17. The system of claim 15, wherein:
the interface comprises a Peripheral Component Interconnect Express Inbound Map that includes Serial Attached Small Computer System Interface discovery information acquired by the controller.

18. The system of claim 15, wherein:
the means are further for identifying status information for the other controller stored in the Peripheral Component Interconnect Express Inbound Map of the other interface, and migrating the logical volume if the status information indicates a failure of the other controller.

19. The system of claim 15, wherein:
the means are further for detecting a change in Serial Attached Small Computer System Interface topology, detecting Serial Attached Small Computer System Interface discovery information stored in the Peripheral Component Interconnect Express Inbound Map of the other interface, and utilizing the discovery information to accelerate discovery at the controller.

20. The system of claim 19, wherein:

the means are further for identifying multiple Serial Attached Small Computer System Interface devices based on the discovery information, and confirming the existence of the devices by sending a Test Unit Ready command to each of the devices.

* * * * *